(12) United States Patent
Mathiowetz et al.

(10) Patent No.: US 7,199,784 B2
(45) Date of Patent: Apr. 3, 2007

(54) ONE-HANDED OPERATION OF A HANDHELD FIELD MAINTENANCE TOOL

(75) Inventors: Brad N. Mathiowetz, Lakeville, MN (US); Alden C. Russell, III, Minnetonka, MN (US)

(73) Assignee: Fisher Rosemount Systems, Inc., Austin, TX (US)

( * ) Notice: Subject to any disclaimer, the term of this patent is extended or adjusted under 35 U.S.C. 154(b) by 293 days.

(21) Appl. No.: 10/439,660

(22) Filed: May 16, 2003

(65) Prior Publication Data

US 2004/0227723 A1 Nov. 18, 2004

(51) Int. Cl.
*G09G 5/00* (2006.01)

(52) U.S. Cl. ....................................... 345/156
(58) Field of Classification Search ............... 345/156; 324/433; 482/93; 455/566, 67.1; 709/219; 702/182; 73/856; 235/462.45; 708/141; 701/29; 600/437; 370/245
See application file for complete search history.

(56) References Cited

U.S. PATENT DOCUMENTS

| | | | |
|---|---|---|---|
| 4,337,516 A | 6/1982 | Murphy et al. ............. 364/551 |
| 4,630,265 A | 12/1986 | Sexton ......................... 370/86 |
| 4,635,214 A | 1/1987 | Kasai et al. ................ 364/551 |
| 4,707,796 A | 11/1987 | Calabro et al. ............. 364/552 |
| 4,954,923 A | 9/1990 | Hoeflich et al. ............ 361/111 |
| 4,964,125 A | 10/1990 | Kim ........................... 371/15.1 |
| 4,988,990 A | 1/1991 | Warrior ..................... 340/25.5 |
| 5,005,142 A | 4/1991 | Lipchak et al. ............. 364/550 |
| 5,103,409 A | 4/1992 | Shimizu et al. ............. 364/556 |
| 5,113,303 A | 5/1992 | Herres ......................... 361/45 |
| 5,148,378 A | 9/1992 | Shibayama et al. .... 364/571.07 |
| 5,150,289 A | 9/1992 | Badavas ..................... 364/154 |
| 5,197,328 A | 3/1993 | Fitzgerald ..................... 73/168 |
| 5,426,774 A | 6/1995 | Banerjee et al. ............ 395/575 |
| 5,434,774 A | 7/1995 | Seberger ..................... 364/172 |
| 5,442,639 A | 8/1995 | Crowder et al. ........... 371/20.1 |
| 5,469,156 A | 11/1995 | Kogure .................. 340/870.38 |
| 5,481,200 A | 1/1996 | Voegele et al. ............. 324/718 |
| 5,570,300 A | 10/1996 | Henry et al. ........... 364/551.01 |
| 5,573,032 A | 11/1996 | Lenz et al. .................. 137/486 |
| 5,598,521 A | 1/1997 | Kilgore et al. .............. 395/326 |

(Continued)

FOREIGN PATENT DOCUMENTS

DE 29917651 12/2000

(Continued)

OTHER PUBLICATIONS

U.S. Appl. No. 09/384,876, filed Aug. 27, 1999, Eryurek et al.

(Continued)

*Primary Examiner*—Bipin Shalwala
*Assistant Examiner*—Prabodh Dharia
(74) *Attorney, Agent, or Firm*—Westman, Champlin & Kelly, P.A.

(57) ABSTRACT

A handheld field maintenance tool is provided with features that improve one-handed operation. In one aspect, the tool includes a side strap to allow a technician to exert additional leverage on the tool during one-handed operation. Another aspect includes providing a recess on the rear of the tool's handle to allow a firm finger-hold.

8 Claims, 6 Drawing Sheets

U.S. PATENT DOCUMENTS

| | | | | |
|---|---|---|---|---|
| 5,623,605 | A | 4/1997 | Keshav et al. | 395/200.17 |
| 5,663,897 | A * | 9/1997 | Geiser | 702/182 |
| 5,665,899 | A | 9/1997 | Willcox | 73/1.63 |
| 5,742,845 | A | 4/1998 | Wagner | 395/831 |
| 5,752,249 | A | 5/1998 | Macon, Jr. et al. | 707/103 |
| 5,764,891 | A | 6/1998 | Warrior | 395/200.2 |
| 5,793,963 | A | 8/1998 | Tapperson et al. | 395/200.31 |
| 5,828,567 | A | 10/1998 | Eryurek et al. | 364/184 |
| 5,838,187 | A | 11/1998 | Embree | 327/512 |
| 5,909,368 | A | 6/1999 | Nixon et al. | 364/131 |
| 5,923,557 | A | 7/1999 | Eidson | 364/471.03 |
| 5,940,290 | A | 8/1999 | Dixon | 364/138 |
| 5,956,663 | A | 9/1999 | Eryurek | 702/182 |
| 5,960,214 | A | 9/1999 | Sharpe, Jr. et al. | 395/835 |
| 5,970,430 | A | 10/1999 | Burns et al. | 702/122 |
| 5,980,078 | A | 11/1999 | Krivoshein et al. | 364/131 |
| 5,995,916 | A | 11/1999 | Nixon et al. | 702/182 |
| 6,017,143 | A | 1/2000 | Eryurek et al. | 364/148.06 |
| 6,023,399 | A | 2/2000 | Kogure | 364/23 |
| 6,026,352 | A | 2/2000 | Burns et al. | 702/182 |
| 6,037,778 | A * | 3/2000 | Makhija | 324/433 |
| 6,047,222 | A | 4/2000 | Burns et al. | 700/79 |
| 6,052,655 | A | 4/2000 | Kobayashi et al. | 702/184 |
| 6,091,968 | A | 7/2000 | Koohgoli et al. | 455/557 |
| 6,094,600 | A | 7/2000 | Sharpe, Jr. et al. | 700/19 |
| 6,111,738 | A | 8/2000 | McGoogan | 361/91.5 |
| 6,119,047 | A | 9/2000 | Eryurek et al. | 700/28 |
| 6,179,964 | B1 | 1/2001 | Begemann et al. | 162/198 |
| 6,192,281 | B1 | 2/2001 | Brown et al. | 700/2 |
| 6,195,591 | B1 | 2/2001 | Nixon et al. | 700/83 |
| 6,211,623 | B1 | 4/2001 | Wilhelm et al. | 315/224 |
| 6,236,334 | B1 | 5/2001 | Tapperson et al. | 340/825.37 |
| 6,263,487 | B1 | 7/2001 | Stripf et al. | 717/1 |
| 6,266,685 | B1 * | 7/2001 | Danielson et al. | 708/141 |
| 6,270,920 | B1 | 8/2001 | Nakanishi et al. | 429/163 |
| 6,298,377 | B1 | 10/2001 | Hartikainen et al. | 709/223 |
| 6,304,934 | B1 | 10/2001 | Pimenta et al. | 710/129 |
| 6,307,483 | B1 | 10/2001 | Westfield et al. | 340/870.11 |
| 6,312,364 | B1 * | 11/2001 | Selsam | 482/93 |
| 6,317,701 | B1 | 11/2001 | Pyotsia et al. | 702/188 |
| 6,324,607 | B1 | 11/2001 | Korowitz et al. | 710/102 |
| 6,356,191 | B1 | 3/2002 | Kirkpatrick et al. | 340/501 |
| 6,370,448 | B1 | 4/2002 | Eryurek | 700/282 |
| 6,377,859 | B1 | 4/2002 | Brown et al. | 700/79 |
| 6,397,114 | B1 | 5/2002 | Eryurek et al. | 700/51 |
| 6,434,504 | B1 | 8/2002 | Eryurek et al. | 702/130 |
| 6,444,350 | B1 | 9/2002 | Toya et al. | 429/90 |
| 6,449,574 | B1 | 9/2002 | Eryurek et al. | 702/99 |
| 6,459,968 | B1 * | 10/2002 | Kochie | 701/29 |
| 6,473,710 | B1 | 10/2002 | Eryurek | 702/133 |
| 6,487,462 | B1 | 11/2002 | Reeves | 700/73 |
| 6,505,517 | B1 | 1/2003 | Eryurek et al. | 73/861.08 |
| 6,519,546 | B1 | 2/2003 | Eryurek et al. | 702/130 |
| 6,532,392 | B1 | 3/2003 | Eryurek et al. | 700/54 |
| 6,539,267 | B1 | 3/2003 | Eryurek et al. | 700/51 |
| 6,594,603 | B1 | 7/2003 | Eryurek et al. | 702/104 |
| 6,594,621 | B1 | 7/2003 | Meeker | 702/185 |
| 6,598,828 | B2 | 7/2003 | Fiebick et al. | 244/118.1 |
| 6,601,005 | B1 | 7/2003 | Kavaklioglu et al. | 702/104 |
| 6,611,775 | B1 | 8/2003 | Coursolle et al. | 702/65 |
| 6,615,149 | B1 | 9/2003 | Wehrs | 702/76 |
| 6,629,059 | B2 | 9/2003 | Borgeson et al. | 702/183 |
| 6,654,697 | B1 | 11/2003 | Eryurek et al. | 702/47 |
| 6,697,681 | B1 | 2/2004 | Stoddard et al. | 700/17 |
| 6,714,969 | B1 * | 3/2004 | Klein et al. | 709/219 |
| 6,757,521 | B1 * | 6/2004 | Ying | 455/67.11 |
| 6,851,612 | B2 | 2/2005 | Iasso et al. | 235/472.01 |
| 2001/0053065 | A1 | 12/2001 | Cudini et al. | 361/728 |
| 2002/0004370 | A1 | 1/2002 | Stengele et al. | |
| 2002/0065631 | A1 | 5/2002 | Loechner | |
| 2002/0077711 | A1 | 6/2002 | Nixon et al. | |
| 2002/0123864 | A1 | 9/2002 | Eryurek et al. | |
| 2002/0181405 | A1 * | 12/2002 | Ying | 370/245 |
| 2003/0023408 | A1 | 1/2003 | Wight et al. | |
| 2003/0023795 | A1 | 1/2003 | Packwood et al. | |
| 2003/0033040 | A1 | 2/2003 | Billings | 700/97 |
| 2003/0058277 | A1 * | 3/2003 | Bowman-Amuah | 345/765 |
| 2003/0141370 | A1 * | 7/2003 | Hamilton et al. | 235/462.45 |
| 2003/0158795 | A1 | 8/2003 | Markham et al. | |
| 2004/0015079 | A1 * | 1/2004 | Berger et al. | 600/437 |
| 2004/0226385 | A1 * | 11/2004 | Mathiowetz et al. | 73/856 |
| 2004/0230327 | A1 * | 11/2004 | Opheim et al. | 700/83 |
| 2004/0248619 | A1 * | 12/2004 | Graiger et al. | 455/566 |
| 2005/0283285 | A1 * | 12/2005 | Ying | 701/29 |

FOREIGN PATENT DOCUMENTS

| | | |
|---|---|---|
| DE | 1993 0660 A1 | 1/2001 |
| EP | 1022626 A2 | 7/2000 |
| GB | 2347232 | 8/2000 |
| JP | 2753592 | 1/1990 |
| WO | WO/96/12993 | 5/1996 |
| WO | WO/97/21157 | 6/1997 |
| WO | WO/98/14855 | 10/1997 |
| WO | WO/98/39718 | 9/1998 |
| WO | WO/00/41050 | 7/2000 |
| WO | WO 00/55700 | 9/2000 |
| WO | WO/02/027418 | 4/2002 |

OTHER PUBLICATIONS

U.S. Appl. No. 09/409,098, filed Sep. 30, 1999, Eryurek et al.
U.S. Appl. No. 09/799,824, filed Mar. 5, 2001, Rome et al.
U.S. Appl. No. 09/852,102, filed May 9, 2001, Eryurek et al.
U.S. Appl. No. 09/855,179, filed May 14, 2001, Eryurek et al.
U.S. Appl. No. 10/790,627, filed Mar. 6, 2003, Mathiowetz.
U.S. Appl. No. 10/438,386, filed Mar. 1, 2004, Mathiowetz et al.
U.S. Appl. No. 10/440,047, filed May 16, 2003, Kantzes et al.
U.S. Appl. No. 10/426,894, filed Apr. 30, 2003, Duren et al.
U.S. Appl. No. 10/438,401, filed May 16, 2003, Opheim et al.
U.S. Appl. No. 10/440,434, filed May 16, 2003, DelaCruz et al.
U.S. Appl. No. 10/435,819, filed May 12, 2003, Kantzes et al.
U.S. Appl. No. 10/440,048, filed May 16, 2003, Duren et al.
U.S. Appl. No. 10/440,444, filed May 16, 2003, Mathiowetz et al.
U.S. Appl. No. 10/439,660, filed May 16, 2003, Mathiowetz et al.
U.S. Appl. No. 10/439,764, filed May 16, 2003, Mathiowetz.
U.S. Appl. No. 10/310,703, filed Dec. 5, 2002, Zielinski et al.
U.S. Appl. No. 10/440,041, filed May 16, 2003, Mathiowetz et al.
U.S. Appl. No. 10/440,441, filed May 16, 2003, Mathiowetz et al.
"Multifunction PDA Calibrator Transmation Model 3-PMF1," Transmation, Apr. 2001.
"AAPA 60 & 90 Series Multimeter," http://www.appatech.com/a-60new.htm (5 pages).
"Fieldbus Standard for Use in Industrial Control Systems Part 2: Physical Layer Specification and Service Definition", ISA-S50.02-1992, pp. 1-93.
Hart Communications, Technical Information, Part 4 Communications, Samson, Frankfurt.
"Fieldbus Brings Protocol to Process Control," Santori et al., IEEE Spectrum, vol. 33, Issue 3, Mar. 1996, pp. 60-64.
"Computerized Maintenance systems-an Overview of Two Basic Types for Field Devices," Medlin, IEEE Pulp and Pater Industry Technical Conference, Jun. 21-25, 1999, pp. 230-232.
"Fieldbus in the Process Control Laboratory-its Time has Come," Rehg. et al., ASEE/IEEE Frontiers in Eduction Conference, vol. 3, Nov. 1999, pp. 13B4/12-13B4/17.
"Generic Device Description for Complex HART Field Devices," Zulkifi et al., IEE 8th International Conference on Communication Systems, vol. 2, Nov. 25-28, 2002, pp. 646-650.
"SFC Smart Field Communicator-Model STS103," Honeywell, Specification, Dec. 1995, pp. 1-4.
"SFC Smart Field Communicator-Models SFC160/SFC260," Yamataka, Specification Apr. 1999, pp. 1-6.

"HART Communication," Fisher-Rosemont, Product Manual, Jul. 2000, pp. i-iv, ix-x, 1-1 -1-40 - 2-1 - 2-1 - 2-8 - 3-1 - 3-38 - A-1 - A-6 - B-1 - B-6 C-1 - C-4 - D-1 - D-4 and I-1 1-2.

Shoji et al., Fieldbus System Engineering, 1999, Yokogawa Technical Report.

Diedrich et al., Field Device Integration in DCS Engineering Using a Device Model, 1998, IEEE.

"HART Communicator," Asset Management Solutions, Fisher-Rosemont, Bulletin 62.1: Communicator, Jan. 2001, pp. 1-7.

"Honeywell Introduces Pocket PC-based Toolkit for Configuring, Monitoring, Diagnosing, and Managing Smart Field Instruments," Oct. 21, 2002, Cyndi Bloom, Honeywell, 2 pages.

* cited by examiner

ONE-HANDED OPERATION OF A HANDHELD FIELD MAINTENANCE TOOL

BACKGROUND OF THE INVENTION

Handheld field maintenance tools are known. Such tools are highly useful in the process control and measurement industry to allow operators to conveniently communicate with and/or interrogate field devices in a given process installation. Examples of such process installations include petroleum, pharmaceutical, chemical, pulp and other processing installations. In such installations, the process control and measurement network may include tens or even hundreds of various field devices which periodically require maintenance to ensure that such devices are functioning properly and/or calibrated. Moreover, when one or more errors in the process control and measurement installation is detected, the use of a handheld field maintenance tool allows technicians to quickly diagnose such errors in the field.

One such device is sold under the trade designation Model 275 HART® Communicator available from Fisher-Rosemount Systems, Inc., of Eden Prairie, Minn. HART® is a registered trademark of the HART® Communication Foundation. The Model 275 provides a host of important functions and capabilities and generally allows highly effective field maintenance. Field maintenance tools, such as the Model 275, are used extensively by field technicians in a number of contexts. First, field technicians will actually carry the handheld tool into the field and use it to interact with field devices. Additionally, technicians will also use the handheld tool in the laboratory to interact with field devices while on a laboratory benchtop, for example.

In process industries, measuring instruments and valves are normally mounted in locations close to the process. Access to these devices for service or maintenance tasks that must be performed at the device is frequently less than convenient, and often requires the use of scaffolding or a ladder. To perform their required tasks, field maintenance technicians may find it necessary to connect and operate the handheld field maintenance tools while actually holding on to the scaffolding. Thus, providing a handheld field maintenance tool that facilitates one-handed operation would significantly improve the effectiveness of field maintenance in these situations.

SUMMARY OF THE INVENTION

A handheld field maintenance tool is provided with features that improve one-handed operation. In one aspect, the tool includes a side strap to allow a technician to exert additional leverage on the tool during one-handed operation. Another aspect includes providing a recess on the rear of the tool's handle to allow a firm finger-hold.

DETAILED DESCRIPTION OF THE PREFERRED EMBODIMENTS

While various embodiments of the present invention will be described with respect to one embodiment of a handheld field maintenance tool product to be available from Fisher-Rosemount Systems, Inc. embodiments of the present invention can be practiced with any handheld field maintenance tool. As used herein, "field maintenance tool" includes any device capable of communicating with a field device either on a benchtop, or in the field, in accordance with a process industry standard protocol. Examples of such protocols include the Highway Addressable Remote Transducer (HART®) protocol and the FOUNDATION™ fieldbus process communication protocol.

Figure 1:
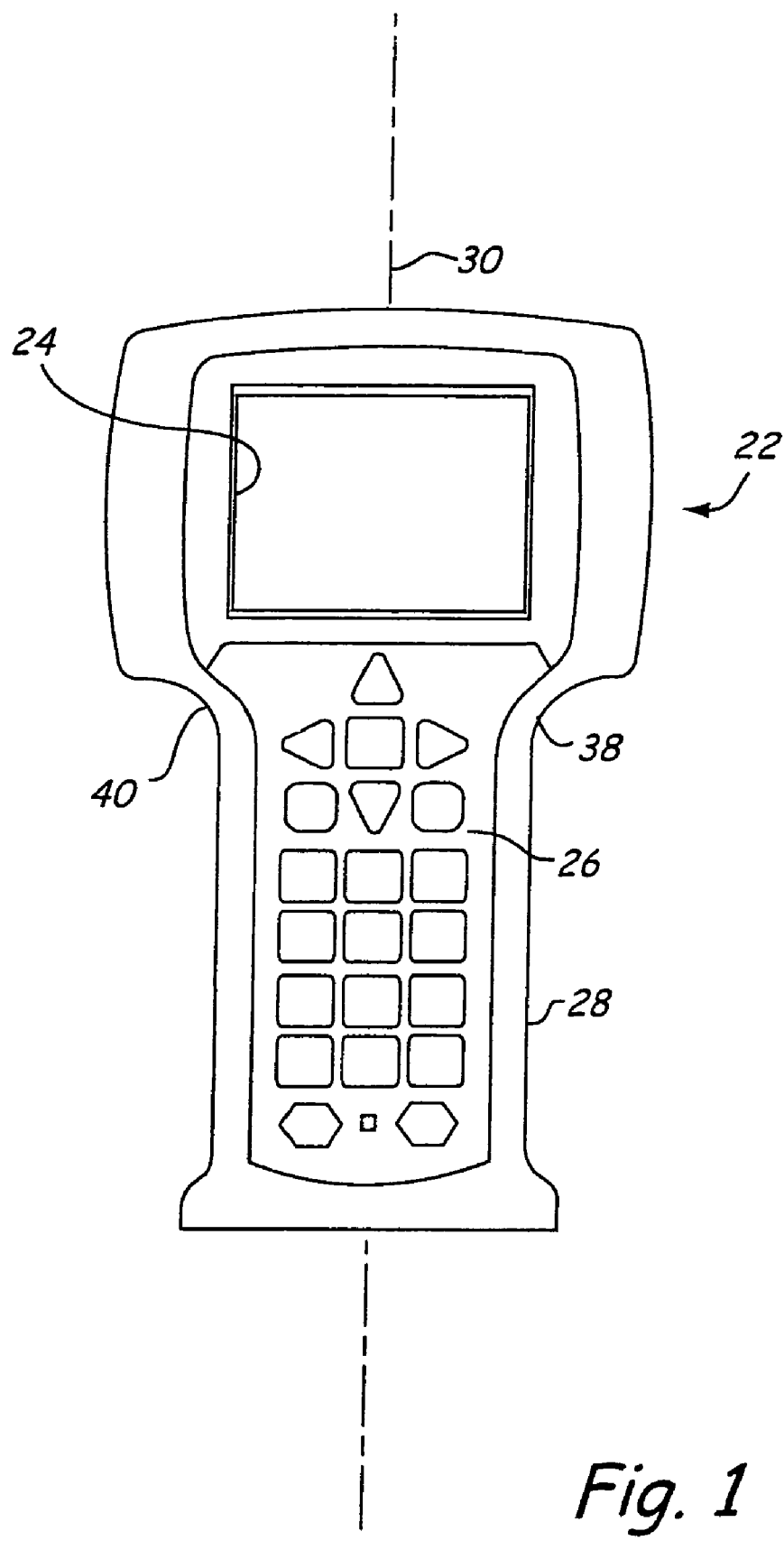
FIG. 1 is a front elevation view of a field communicator adapted for one-handed operation in accordance with embodiments of the present invention.

FIG. 1 is a front elevation view of a handheld field maintenance tool in accordance with embodiments of the present invention. Tool 22 includes display 24 disposed proximate keypad 26 on handle 28. One-handed operation of tool 22 includes holding on to tool 22 itself, and the use of physical buttons on keypad 26 for menu navigation and data entry and retrieval. Aspects of embodiments of the present invention include the shape of tool 22 (illustrated in FIG. 1), the weight of tool 22 (preferably less than about 1.0 kilogram) and a center of gravity that is selected such that it is relatively symmetrical about the intended grip of a user of tool 22. Additionally, certain physical features, which will be described in further detail later in the Specification, facilitate holding and operating tool 22 for extended periods of time using only one hand. Additionally, tool 22 is balanced about longitudinal axis 30 such that it will remain balanced for both left-handed and right-handed users.

Figure 2:
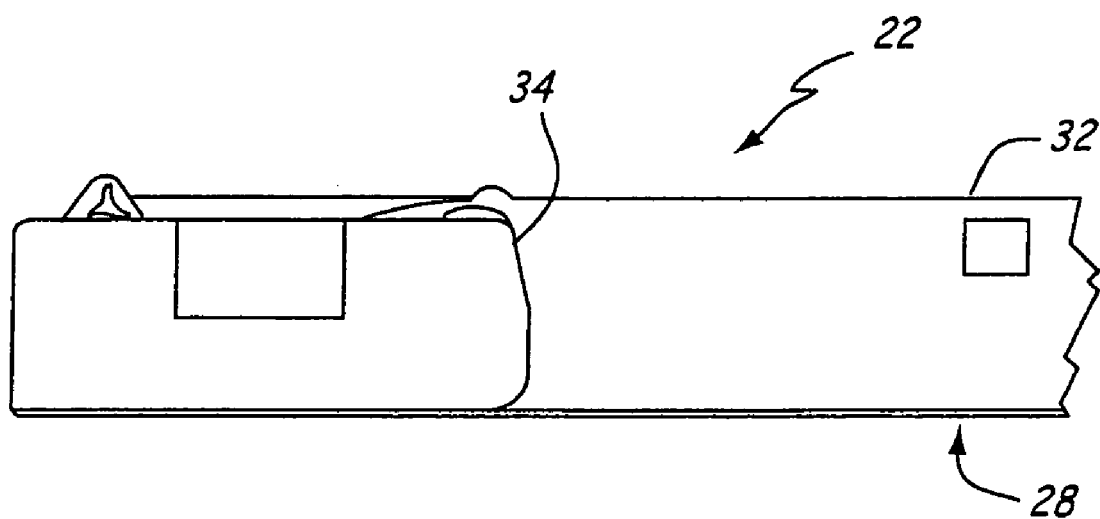
FIG. 2 is a side elevation view of a handheld field maintenance tool adapted for one-handed operation in accordance with embodiments of the present invention.

FIG. 2 is a side elevation view of tool 22 illustrating a plurality of grooves 32 disposed along handle 28. Grooves 32 help reduce the possibility that handle 28 will slip in a technician's hand. FIG. 2 also illustrates an angled region 34 which will be described in greater detail with respect to FIG. 4.

Figure 3:
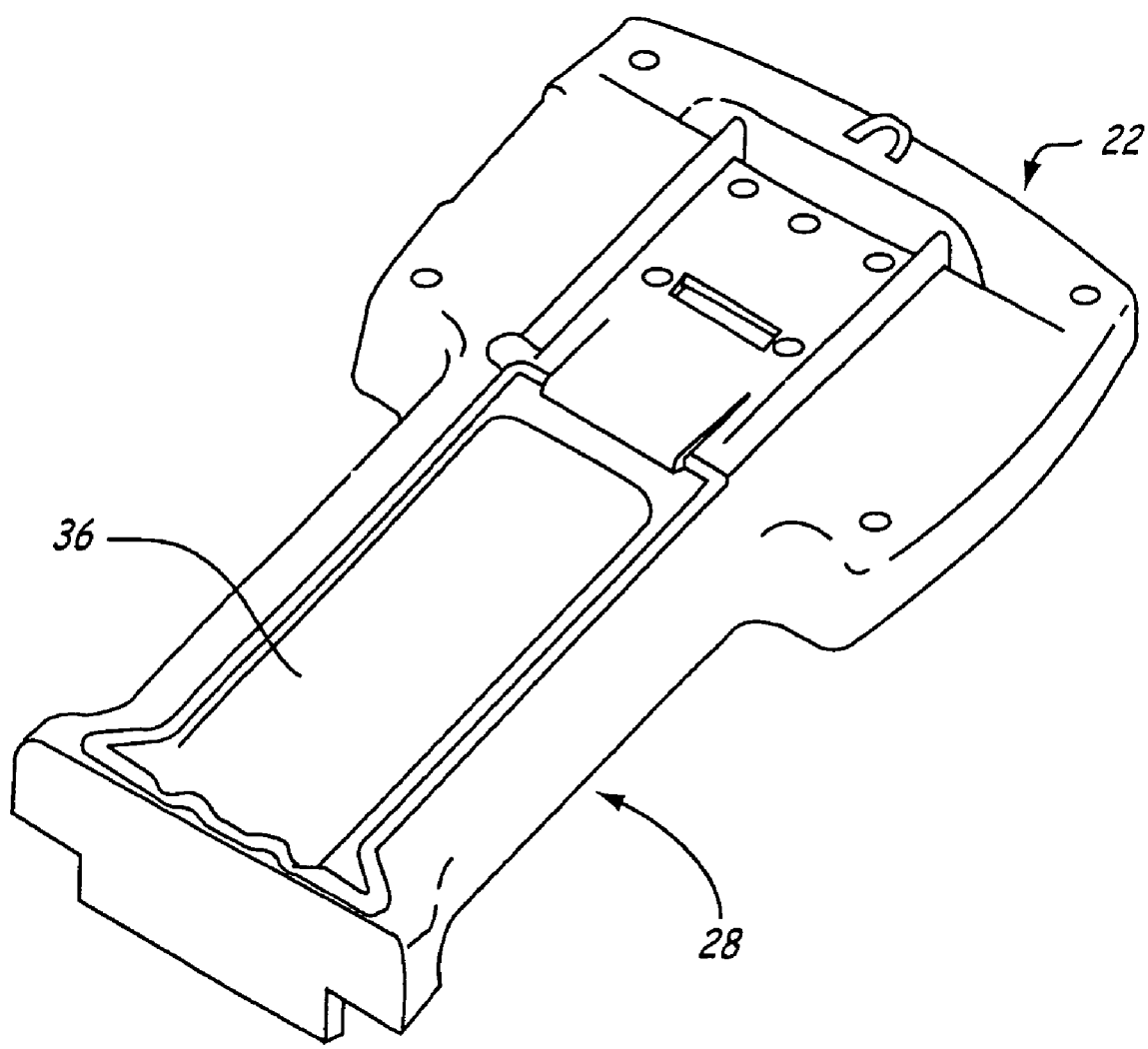
FIG. 3 is rear perspective view of a handheld field maintenance tool adapted for one-handed operation in accordance with embodiments of the present invention.

FIG. 3 is a rear perspective view of handheld field maintenance tool 22 in accordance with embodiments of the present invention. FIG. 3 shows a recessed portion 36 on the rear of handle 28. This elongated recess on the rear of handle 28 allows a firm finger-hold for either the technician's right or left hand.

Figure 4:
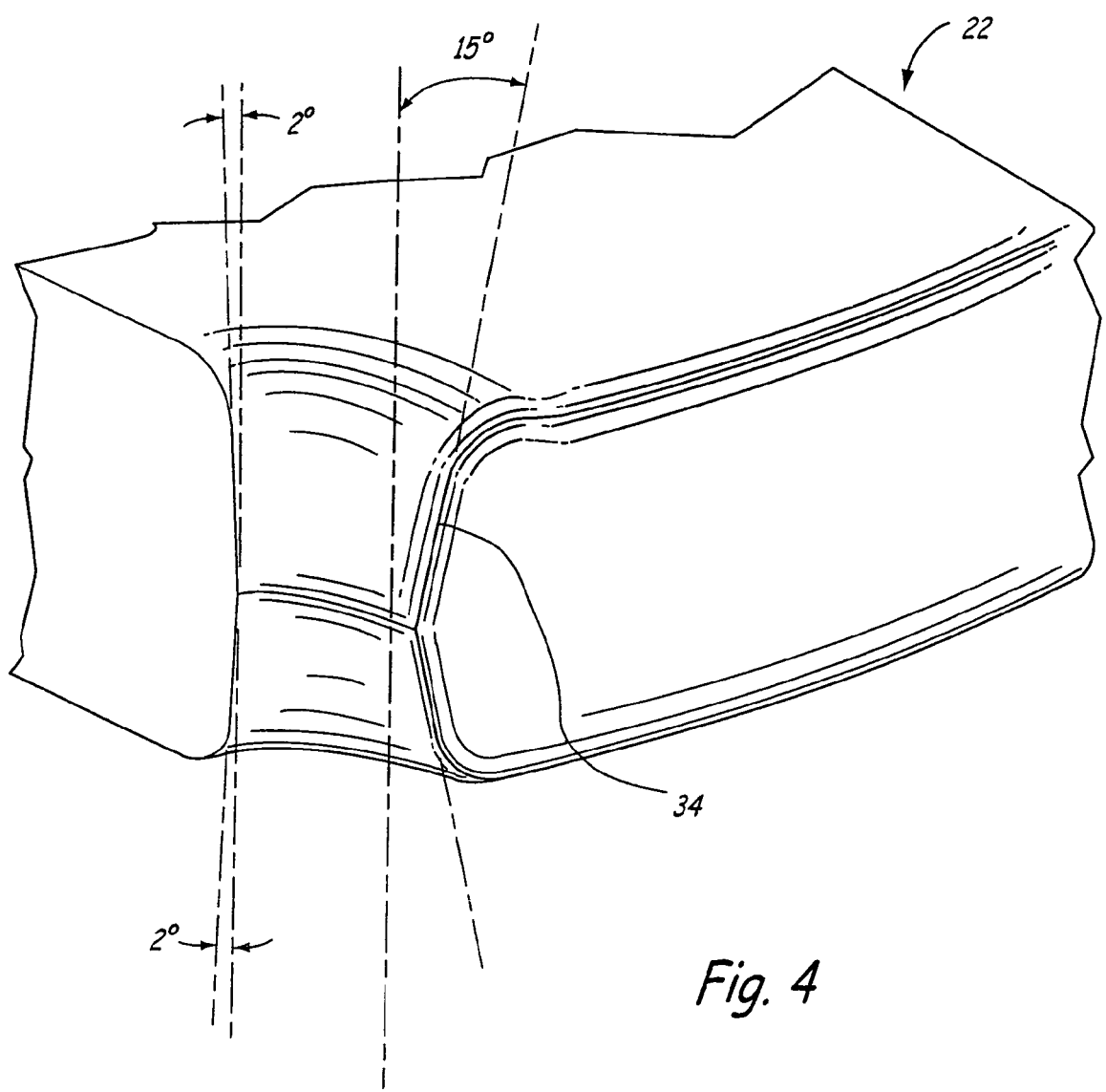
FIG. 4 is a partial perspective view of a portion of a handheld field maintenance tool providing features that facilitate one-handed operation in accordance with embodiments of the present invention.

FIG. 4 is a perspective view of a portion of tool 22 in accordance with embodiments of the present invention. Specifically, FIG. 4 illustrates a portion of tool 22 proximate curves 38 and 40 (illustrated in FIG. 1). FIG. 4 also shows angled region 34 which is illustrated having an angle departing from vertical of approximately 15 degrees. This angled region and many of the curved edges illustrated in FIG. 4 facilitate technician comfort during extended one-handed operation of tool 22. FIG. 4 also illustrates that handle 28 does not include completely vertical walls. Instead, the sidewalls of handle 28 depart from vertical by an angle of approximately 2 degrees. The angles illustrated in FIG. 4 are exemplary only and it is expressly understood that changes can be made thereto without departing from the spirit and scope of the invention.

Figure 5:
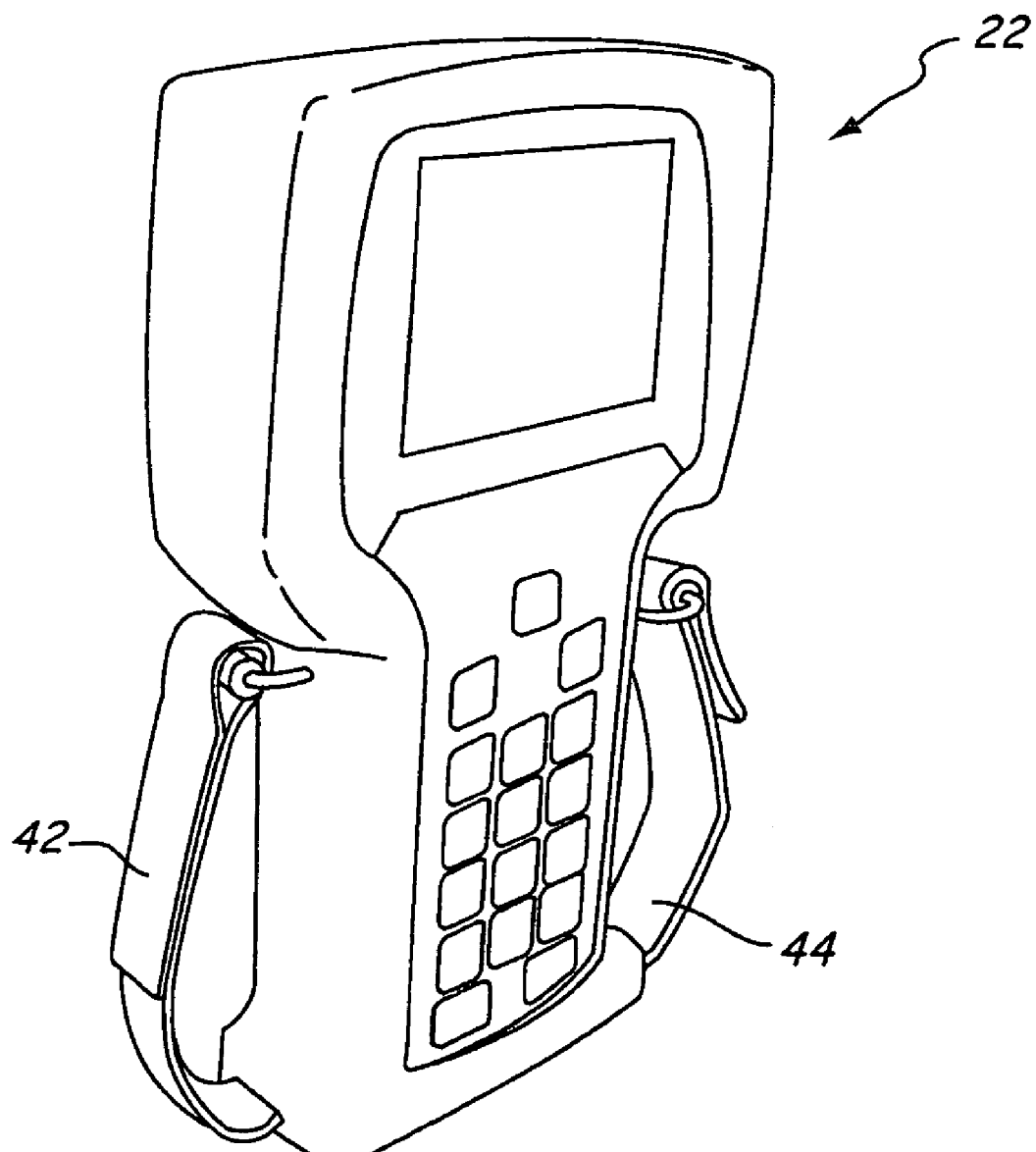
FIG. 5 is a front perspective view of a handheld field maintenance tool including a handled strap adapted for one-handed operation in accordance with embodiments of the present invention.

FIG. 5 is a front perspective view of a handheld field maintenance tool in accordance with an embodiment of the present invention. FIG. 5 illustrates handheld tool 22 having flexible side straps 42 and 44. Preferably, a single side strap is provided with tool 22 and can be mounted on either side of tool 22 to facilitate left-handed or right-handed operation of tool 22. Side straps 42 and 44 allow the technician to apply leverage with either hand enabling operation of navigation buttons and/or alpha-numeric data entry buttons with the thumb while comfortably gripping tool 22 with the same hand.

Figure 6:
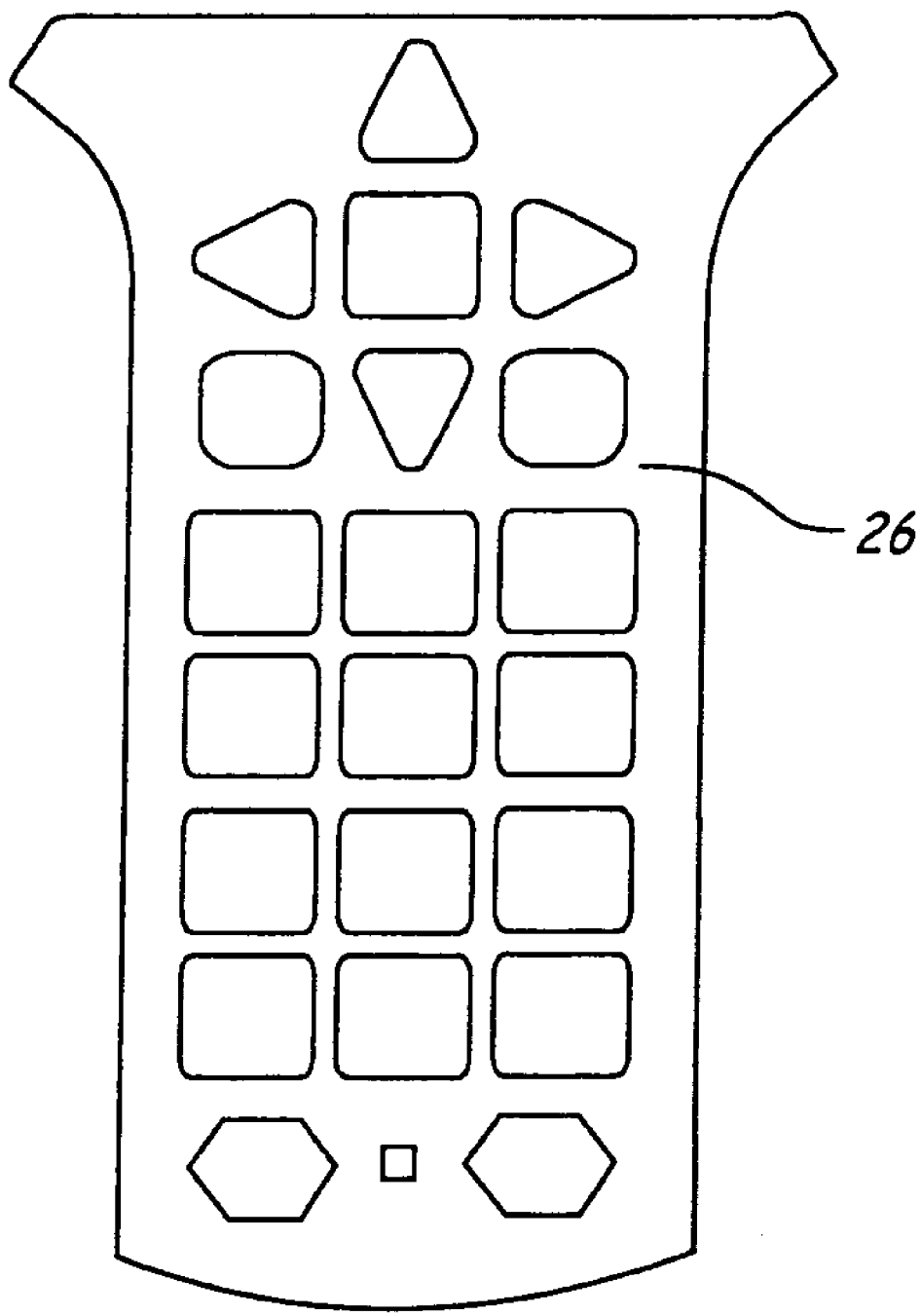
FIG. 6 is a diagrammatic view of a user interface keypad facilitating one-handed operation in accordance with embodiments of the present invention.

FIG. 6 is a diagrammatic view of keypad 26 for handheld field maintenance tool 22. Keypad 26 is relatively narrow and this allows keypad 26 to be reachable by the thumb of an average human hand when holding device 22. Accordingly, the technician can reach any of the buttons on keypad 26 with his or her thumb while holding tool 22.

Although the present invention has been described with reference to preferred embodiments, workers skilled in the art will recognize that changes may be made in form and detail without departing from the spirit and scope of the invention.

What is claimed is:

1. A handheld field maintenance tool comprising:
a display;
a handle coupled to the display and having a recess in a rear portion thereof such that when a user grips the tool with a single hand, the recess is configured to receive the user's finger to facilitate gripping of the tool;
a first strap disposed on a first side of the tool to allow a user to apply leverage; and
a second strap disposed on the opposite side of the tool.

2. The tool of claim 1, and further comprising a keypad mounted on the handle and sized to be usable with a thumb of a user the handle is held with a single hand.

3. The tool of claim 1, wherein the tool has a weight that is less than about one kilogram.

4. The tool of claim 1, wherein the tool has a center of gravity to balance upon a technician's hand.

5. The tool of claim 1, wherein the center of gravity is centered with respect to a longitudinal axis of the tool.

6. The tool of claim 1, and further comprising a plurality of grooves in the handle to improve gripping of by a user's hand.

7. The tool of claim 1, and further comprising a radius section adjacent the display and handle to facilitate gripping by the hand of a user.

8. The tool of claim 1, wherein the handle includes edge portions for engagement with a user's hand wherein the edge portions constitute radius portions to facilitate gripping by the user.

* * * * *